US011301217B1

(12) United States Patent
Gezen et al.

(10) Patent No.: US 11,301,217 B1
(45) Date of Patent: Apr. 12, 2022

(54) SYSTEMS AND METHODS FOR AUTOMATED BUILDING, MANAGING, AND DISTRIBUTING OF OPERATING SYSTEMS WITH DIFFERENT CUSTOMIZATIONS FOR DIFFERENT USERS

(71) Applicant: CTRL IQ, Inc., Albany, CA (US)

(72) Inventors: Mustafa Gezen, Tromso (NO); Gregory Kurtzer, Albany, CA (US); John Frey, Sammamish, WA (US); Neil Hanlon, Lexington, MA (US)

(73) Assignee: CTRL IQ, Inc., Albany, CA (US)

( * ) Notice: Subject to any disclaimer, the term of this patent is extended or adjusted under 35 U.S.C. 154(b) by 0 days.

(21) Appl. No.: 17/544,266

(22) Filed: Dec. 7, 2021

(51) Int. Cl.
*G06F 8/20* (2018.01)
*G06F 9/451* (2018.01)
*G06F 9/4401* (2018.01)

(52) U.S. Cl.
CPC .............. *G06F 8/20* (2013.01); *G06F 9/451* (2018.02); *G06F 9/4406* (2013.01)

(58) Field of Classification Search
CPC ........... G06F 8/20; G06F 9/451; G06F 9/4406
USPC .................. 717/109–120, 168–175
See application file for complete search history.

(56) References Cited

U.S. PATENT DOCUMENTS

| 5,894,571 | A  | * | 4/1999 | O'Connor | G06F 21/00 713/2 |
| 6,182,275 | B1 | * | 1/2001 | Beelitz | G06F 8/63 715/721 |
| 6,236,901 | B1 | * | 5/2001 | Goss | G05B 19/41865 700/83 |
| 6,543,047 | B1 | * | 4/2003 | Vrhel, Jr | G06F 8/61 717/121 |
| 6,775,829 | B1 | * | 8/2004 | Kroening | G06F 8/63 717/121 |
| 6,892,104 | B2 | * | 5/2005 | Patil | G05B 19/44 700/95 |
| 7,596,785 | B2 | * | 9/2009 | Burkhardt | G06F 8/61 717/174 |

(Continued)

OTHER PUBLICATIONS

Appovoo et al, "Experience Distributing Objects in an SMMP OS", ACM, pp. 1-52 (Year: 2007).*

(Continued)

*Primary Examiner* — Anil Khatri
(74) *Attorney, Agent, or Firm* — Ansari Katiraei LLP; Arman Katiraei; Sadiq Ansari

(57) ABSTRACT

Disclosed are systems and methods that include user interfaces ("UIs") and a controller for automating the building, management, and distribution of operation systems ("OSes") with different customizations for different users. A UI may include selectable elements for different OS distributions, and may present a first set of components from a selected particular OS distribution and a second set of components that are not included with the particular OS distribution. The controller may generate a custom OS build based on a first subset of components that are selected from the first set of components, and a second subset of components that are selected from the second set of component using the UI. The controller may provide a repository that is accessed with an identifier and that links to each selected component of the custom OS build, and may distribute the custom OS build from the repository to a node.

18 Claims, 9 Drawing Sheets

(56) References Cited

U.S. PATENT DOCUMENTS

| | | | | |
|---|---|---|---|---|
| 8,255,904 B2* | 8/2012 | Sheppard | ................ | G06F 21/75 |
| | | | | 717/172 |
| 8,352,935 B2* | 1/2013 | Isaacson | .................... | G06F 8/61 |
| | | | | 709/227 |
| 8,875,125 B2* | 10/2014 | Liles | ......................... | G06F 8/61 |
| | | | | 717/174 |

OTHER PUBLICATIONS

Kale et al, "Distributing Subsystems across Different Kernels running simultaneously in a Multi-Core Architecture", IEEE, pp. 114-120 (Year: 2011).*

Xu et al, "State-of-the-art User Interfaces for Building Operating Systems", IEEE, pp. 283-292 (Year: 2017).*

Ashraf et al., "Customizing Linux Operating System for Implementing various Services in Cloud Environment", IEEE, pp. 923-930 (Year: 2014).*

Gopal et al, "Structuring Operating Systems using Adaptive Objects for Improving Performance", IEEE, pp. 130-133 (Year: 1995).*

* cited by examiner

SYSTEMS AND METHODS FOR AUTOMATED BUILDING, MANAGING, AND DISTRIBUTING OF OPERATING SYSTEMS WITH DIFFERENT CUSTOMIZATIONS FOR DIFFERENT USERS

BACKGROUND

An operating system ("OS") may manage and allocate underlying hardware resources to other software or applications. A user may customize various OS components and/or configurations. The customizations may adapt, optimize, augment, and/or change the OS for faster, more efficient, more compatible, and/or enhanced execution in the user's environment.

OS customization may begin with a user downloading an OS distribution from a particular repository. The OS distribution may provide a kernel along with a standard set of components that allow the OS to work across a variety of hardware and software and/or to provide a common set of services. The user may customize the OS to optimize the OS for a specific set of hardware and/or software, to remove unnecessary components and/or services that use resources (e.g., either running in the background or in the foreground), to configure included components and/or services for the user's environment or use cases, and/or to add new components and/or services that the user requires and that are not included as part of the distribution. To do so, the user may manually configure the kernel and/or included components, may manually remove the unneeded components included within the distribution, and may manually download and configure the additional components that were not included within the distribution.

Human administration of customized OS builds may cause various issues and/or errors that may increase time to initializing the user environment and that may decrease performance within the user environment. The number of customizations to manage for each OS build and for the number of devices or systems in the user environment, the dependencies and/or computability requirements that must be accounted for with each customization, and the continual maintenance and/or updating that may be required for each customization may introduce issues and/or errors that mitigate or remove any benefit from customizing the OSes.

DETAILED DESCRIPTION OF PREFERRED EMBODIMENTS

Figure 1:
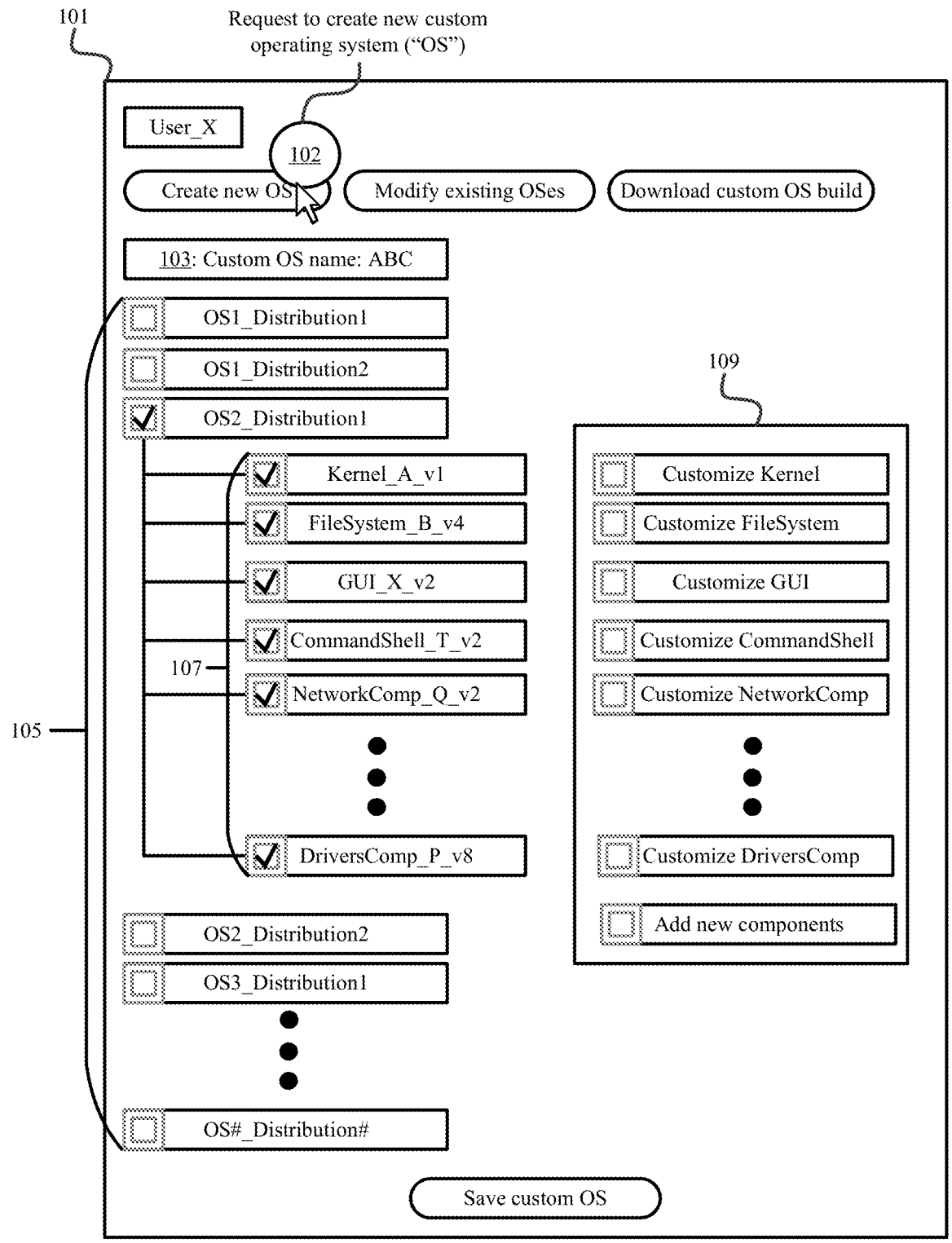
FIG. 1 illustrates an example of a dynamic user interface ("UI") for defining a custom operating system ("OS") build in accordance with some embodiments presented herein.

The following detailed description refers to the accompanying drawings. The same reference numbers in different drawings may identify the same or similar elements.

Disclosed are systems and methods for automated building, managing, and distributing of operation systems ("OSes") with different customizations for different users. The systems and methods may include dynamic user interfaces ("UIs") for defining and/or customizing each custom OS build, and a controller for generating, managing access, and/or updating repositories with the customized components of each custom OS build.

In some embodiments, the UIs may present available, compatible, and interchangeable components for different OS distributions. The UIs may dynamically change the components to include components that are compatible with and/or share dependencies with other selected components to ensure that the resulting customizations and swapping of components produce a functioning OS. The UIs may permit for the customization of each selected component or may automatically configure a selected component with parameters that render the selected component compatible with other selected components. The UIs may further filter the components to present premium components for paid users, users with specific access permissions, and/or components created by the users or other users.

In some embodiments, the controller may generate a project definition for each defined custom OS build, and/or may generate a repository from which users may access their custom OS builds with the customized components and/or custom configurations. In some such embodiments, each repository may be a virtual repository that links to a different subset of components from a component repository. The component repository may store all OS distributions, kernels, components, and/or customizations, and each repository may link to a different subset of components without creating duplicative copies of the same components in different repositories.

The controller may use the component repository as a single source of truth from which an updated particular component may be automatically distributed into and included as part of each repository and/or custom OS build that includes an older version of the updated particular component without users having to manually select or introduce the updated particular component into their repositories and/or without the users having to manually reconstruct their custom OS builds every time an included component receives an update. In some embodiments, the controller may provide a notification of the updated particular component to users of each user repository that includes the older version of the updated particular component, and the controller may swap the older version of the particular component with the updated particular component in a repository of a particular user in response to confirmation from the particular user receiving the notification about the updated particular component.

FIG. 1 illustrates an example of a dynamic UI 101 for defining a custom OS build in accordance with some embodiments presented herein. Dynamic UI 101 may provide interactive elements with which a particular user may provide login credentials in order to access previously created OS builds and/or to create a new custom OS build.

In response to user input requesting (at 102) creation of a new custom OS build, dynamic UI 101 may provide input field 103 for naming the custom OS build, and may present different OS distributions 105 on which to base the custom OS build.

Each distribution in the list of distributions 105 may include a different base set of components. For instance, base set of components 107 for a particular OS distribution may include a kernel, program, or code for managing hardware resources and/or handling requests from other programs and applications to execute based on some allocated set of resources. Base set of components 107 may also include programs, applications, and/or code that run atop or in conjunction with the kernel, and that provide various services. The services may connect the kernel to other applications and/or may provide the interface to various hardware sources. For instance, a filesystem component may provide one or more services for connecting the kernel to one or more storage devices (e.g., file services), a network component may provide one or more services for connecting the kernel to one or more network interfaces and for communicating with other devices over a wired or wireless network connection (e.g., networking services), a desktop environment component may provide the graphical user interface ("GUI") for OS interactions, a command component (e.g., Bash, Bourne shell, Z shell, etc.) may provide a command line interface with which to issue commands and/or execute scripts, and/or other components may provide the device drivers, system utilities, and/or other software for interfacing with the hardware sources and/or for providing other functionality.

UI 101 may provide interactive elements (e.g., graphical checkboxes, selectable radio boxes, etc.) for selecting an OS distribution from distribution list 105, and/or selecting which of the base set of components of an OS distribution to retain or exclude from the custom OS build UI 101 may dynamically adapt in response to an initial selection of a set of components from an OS distribution. For instance, UI 101 may provide interactive elements 109 for customizing any of the initially selected set of components with different sets of compatible, access permitted, and/or swappable components, and/or for adding new components that offer different or additional services beyond the services provided by the base set of components that define a particular OS distribution.

Figure 2:
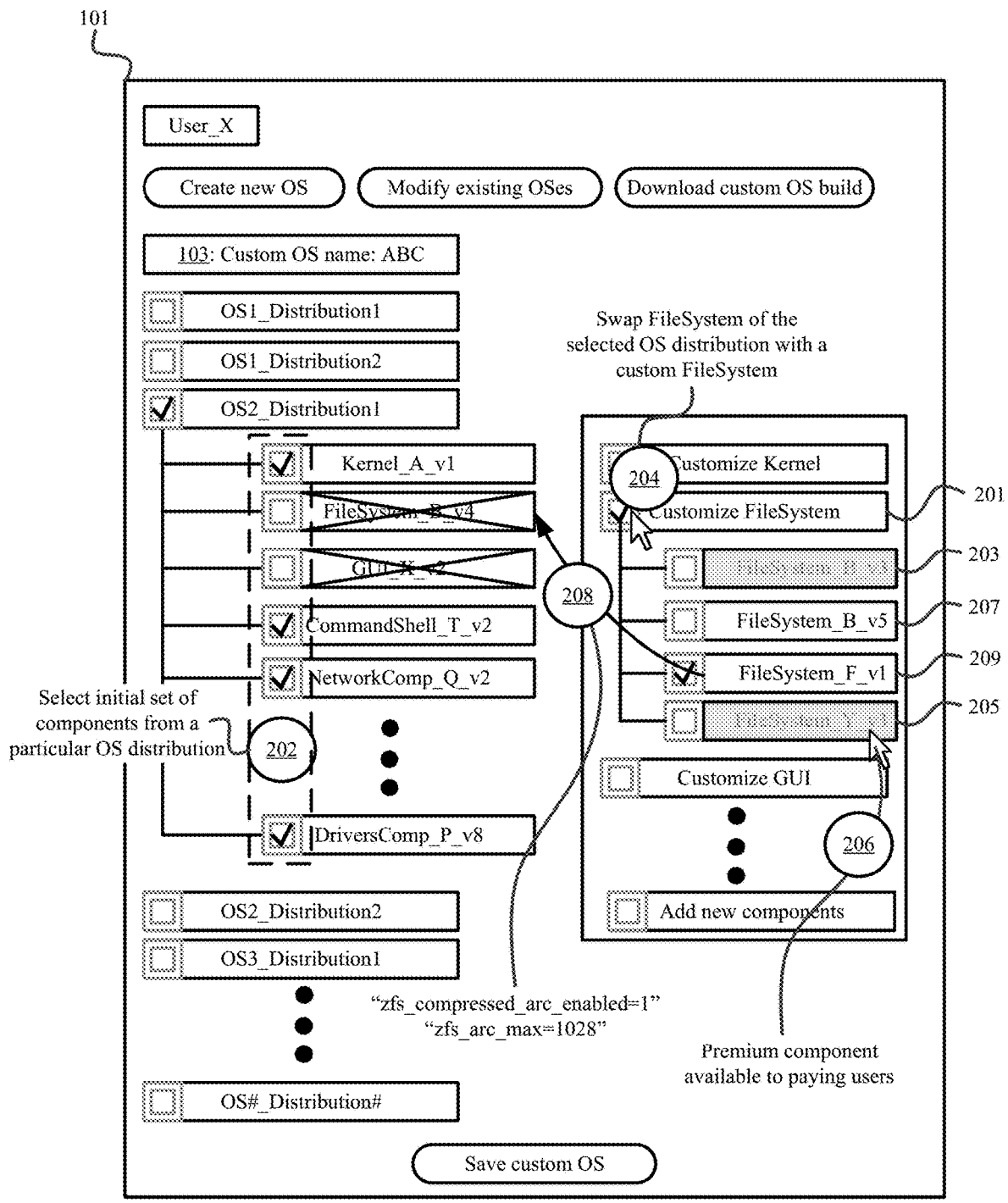
FIG. 2 illustrates a UI example that dynamically adapts according to components that have been selected for inclusion in a custom OS build in accordance with some embodiments presented herein.

FIG. 2 illustrates an example of UI 101 that dynamically adapts according to components that have been selected for inclusion in a custom OS build in accordance with some embodiments presented herein. As shown in FIG. 2, a user may select (at 202) an initial set of components for a custom OS from a particular OS distribution, and may select (at 204) interactive element 201 to customize the filesystem component.

In response to the initial selections (at 202 and 204), UI 101 may adapt to present components that are compatible with the selected kernel and/or initial selected set of components, that the user is permitted to access based on access permissions associated with the user, the user account, and the available components, and/or that may serve as substitutes or replacements for the initial set of components. For instance, UI 101 may gray out first substitute component 203 to make it unavailable for inclusion as part of the custom OS build because the controller or UI 101 determines that first substitute component 203 is incompatible with the other selected components or would cause the custom OS build to become inoperable because of compatible or dependency issues between first component 203 and the other selected components. Similarly, UI 101 may gray out second substitute component 205 to make it unavailable for inclusion as part of the custom OS build because the controller or UI 101 determines that second substitute component 205 is a component that the particular user does not have access to because second substitute component 205 is a component only available to users of a specific payment tier or because second substitute component 205 is a custom component that is modified by and restricted for use by a specific set of users. However, UI 101 may present third substitute component 207 and fourth substitute component 209 as alternative components that are compatible with the other selected components, that the user has access to, and that may be included as part of the user's custom OS build. For instance, the selected OS distribution may include a filesystem component that implements the XFS filesystem, and UI 101 may present fourth substitute component 209 that may swap the XFS file system of the OS build with the ZFS file system. A user may select fourth substitute component 209 to replace the component included with the selected OS distribution based on the ZFS file system providing better performance than the XFS file system for the intended user environment and/or hardware that will run the custom OS build, and/or providing features and/or functionality that are not present in the XFS file system.

In some embodiments, UI 101 may provide (at 206) identifying information about each substitute component in response to a mouse hover, selection, or other user action performed with respect to each substitute component. The identifying information may describe services, features, dependencies, compatibilities, versioning, performance, changes, updates, and/or other properties of the component, and/or may explain why the component is available or unavailable for inclusion as part of the user's custom OS build.

In response to a user selection of fourth substitute component 209, UI 101 and/or the system controller may customize the custom OS build to include fourth substitute component 209 instead of an original component from the selected OS distribution that provides similar services or functionality. The OS customization may occur without the user manually deleting, adding, or modifying any packages, binaries, and/or components of the OS distribution.

In some embodiments, the individual components selected for the custom OS build may be individually customized. Customizing a particular component may include setting parameters and/or flags that control operations of the particular component or interactions between the particular component and other components. For instance, FIG. 2 illustrates customizing (at 208) the ZFS file system "zfs_compressed_arc_enabled" parameter to a true value (e.g., enabling compression) and specifying the maximum size of the Adaptive Replacement Cache ("ARC") by setting the "zfs_arc_max" parameter. Other parameters may be set to enable or disable certain services, features, and/or functionality of a configured component.

In some embodiments, the controller may automatically configure the parameter of a particular component based on other selected components. For instance, the controller may set parameters that maximize compatibility and/or performance between different components that access the same data, interact with another, are dependent on one another, etc.

Figure 3:
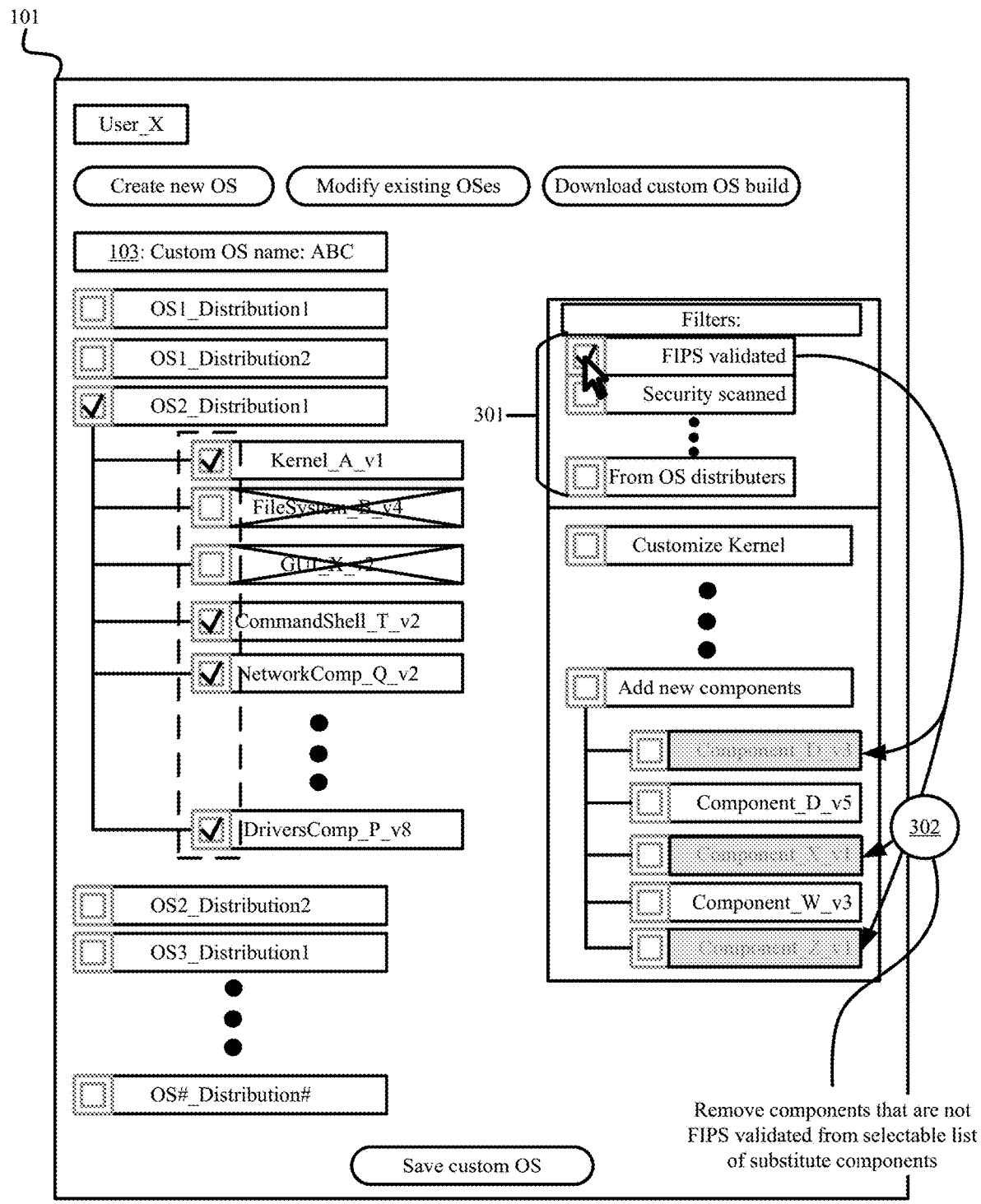
FIG. 3 illustrates a UI example that dynamically adapts to present a filtered set of components for inclusion in a custom OS build in accordance with some embodiments presented herein.

In addition to automatically filtering components based on compatibility, permitted access, and/or other parameters, UI 101 may provide one or more filters that users may select to isolate a desired set of substitute components. FIG. 3 illustrates an example of UI 101 dynamically adapting to present a filtered set of components for inclusion in a custom OS build in accordance with some embodiments presented herein.

As shown in FIG. 3, UI 101 may include interactive elements 301 for filtering the set of available, compatible, and/or substitute components for a custom OS build. For instance, UI 101 may include an interactive element for filtering the list of available components to include components that are Federal Information Processing Standard ("FIPS") validated or that are validated with a specific FIPS security level (e.g., level 1, 2, 3, or 4). The FIPS validation may be required for the custom OS, included components, and/or other software that is to be run at specific sites. UI 101 may simplify the customization of a custom OS build that is FIPS validated by filtering (at 302) to present FIPS validated components for inclusion in that custom OS build, and/or by automatically removing (at 302) any components that are not FIPS validated from that custom OS build in response to activation of the FIPS validation filter in UI 101.

The controller may monitor the user interactions with UI 101, and may generate custom OS builds in response to the monitored user interactions. In particular, the controller may create a custom OS build that includes each component that a user selects for the custom OS build, including components from a base OS distribution, components that were removed from the base OS distribution, components from the base OS distribution that were replaced with substitute components providing similar, updated, or modified functionality, and/or new components for services that were not part of the base OS distribution but that are desired for the custom OS build and/or the target environment where the custom OS build is to run.

In some embodiments, generating a custom OS build may include providing and/or installing any dependencies, packages, binaries, and/or other software to run the custom OS on one or more compute node or sets of hardware resources. In some embodiments, generating the custom OS build may include building a binary package based on the included components. Building the binary package may include compiling source code from the different included components in order to produce the custom OS package.

Figure 4:
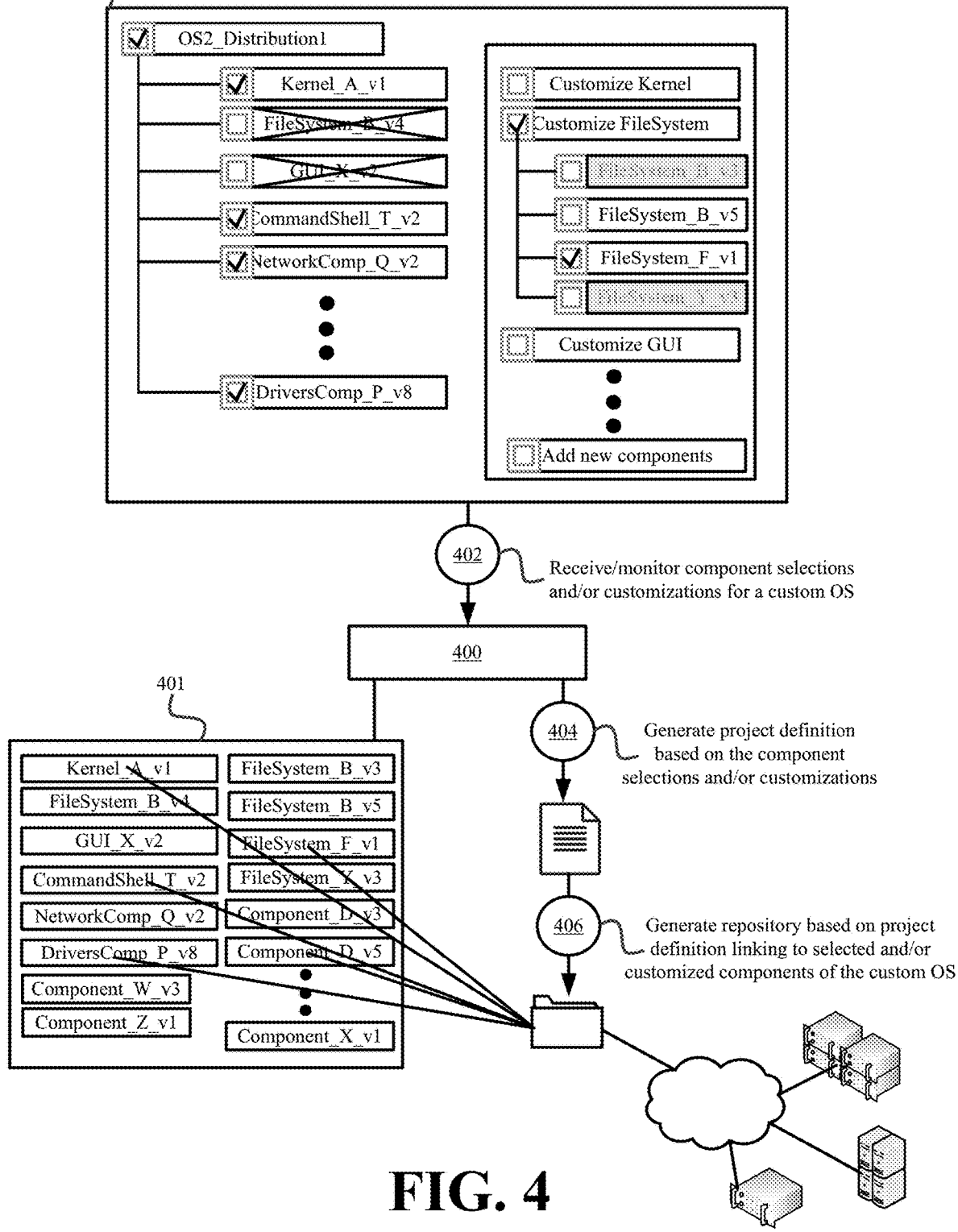
FIG. 4 illustrates an example of a controller generating a particular custom OS build based on a custom definition created via the UIs in accordance with some embodiments presented herein.

FIG. 4 illustrates an example of controller 400 generating a particular custom OS build based on a custom definition created via UI 101 in accordance with some embodiments presented herein. Controller 400 may receive (at 402) and/or monitor the selections and/or customizations that are made in UI 101 and/or that define the particular custom OS, and may generate (at 404) a project definition for the particular custom OS based on the selections and/or customizations made in UI 101.

Controller 400 may list the kernel and/or components of the particular custom OS build in the project definition. In some embodiments, the project definition may include a record that is created in a database and that is associated with a particular user profile. In some embodiments, the project definition may include a project definition file (e.g., *.mmp file) and/or a component description file (e.g., *.bld.inf file).

Generating (at 404) the project definition may also include defining and/or configuring custom parameters for one or more of the selected components. The custom parameters may be entered into the project definition and applied when the selected components of the particular custom OS build are distributed and/or compiled as part of a build package.

Controller 400 may create (at 406) a new repository for accessing the particular custom OS build. Creating (at 406) the repository may include defining a unique directory path, Uniform Resource Locator ("URL"), pointer, and/or another identifier for accessing the components of the particular custom OS build. In some embodiments, the repository may be a virtual directory, site, and/or repository. Specifically, the repository may not contain actual copies of the particular custom OS components. Rather, the repository may contain pointers, links, and/or other identifiers for accessing each of the particular custom OS components from component repository 401. In other words, the repository may be defined as a one-to-many identifier, whereby a user may issue a request to access the single identifier associated with the particular custom OS build and/or repository, and controller 400 may map that single identifier to a set of identifiers for the actual storage location of each components included as part of the particular custom OS build. In some embodiments, the repository may apply any custom parameters to the associated components. For instance, the custom OS build may include parameters for enabling a first set of features of a particular component and for disabling a second set of features of the particular component. The new repository may link to the particular component in the component repository, and may provide access to the particular component with the custom parameters applied and/or configured.

In some embodiments, creating (at 406) the new repository may include compiling the code from particular custom OS components stored in component repository 401, and storing the particular custom OS build package in the new repository. In some such embodiments, the particular custom OS components may be compiled with any associated or configured custom parameters.

Component repository 401 may be a single source of truth for the components of all custom OS builds generated and/or made accessible by controller 400. In other words, the repositories for the custom OS builds do not contain duplicative copies of the same components (e.g., same files, packages, source code, etc.). Instead, a single copy of all components is stored in component repository 401, and each custom OS build that includes the same particular component may point to the same instance of the particular component that is stored in component repository 401. Consequently, additional storage does not need to be allocated for each newly defined custom OS build. The systems and methods are therefore able to create and provide access to an almost infinite number of custom OS builds.

Users and/or user devices may remotely access the created (at 406) repository using the associated identifier in order to download, deploy, install, and/or run the custom OS on the user devices. Specifically, component repository 401 may provide each selected and/or customized component of the custom OS in response to an access and/or download request that specifies the identifier for the repository created (at 406) for the particular custom OS.

Figure 5:
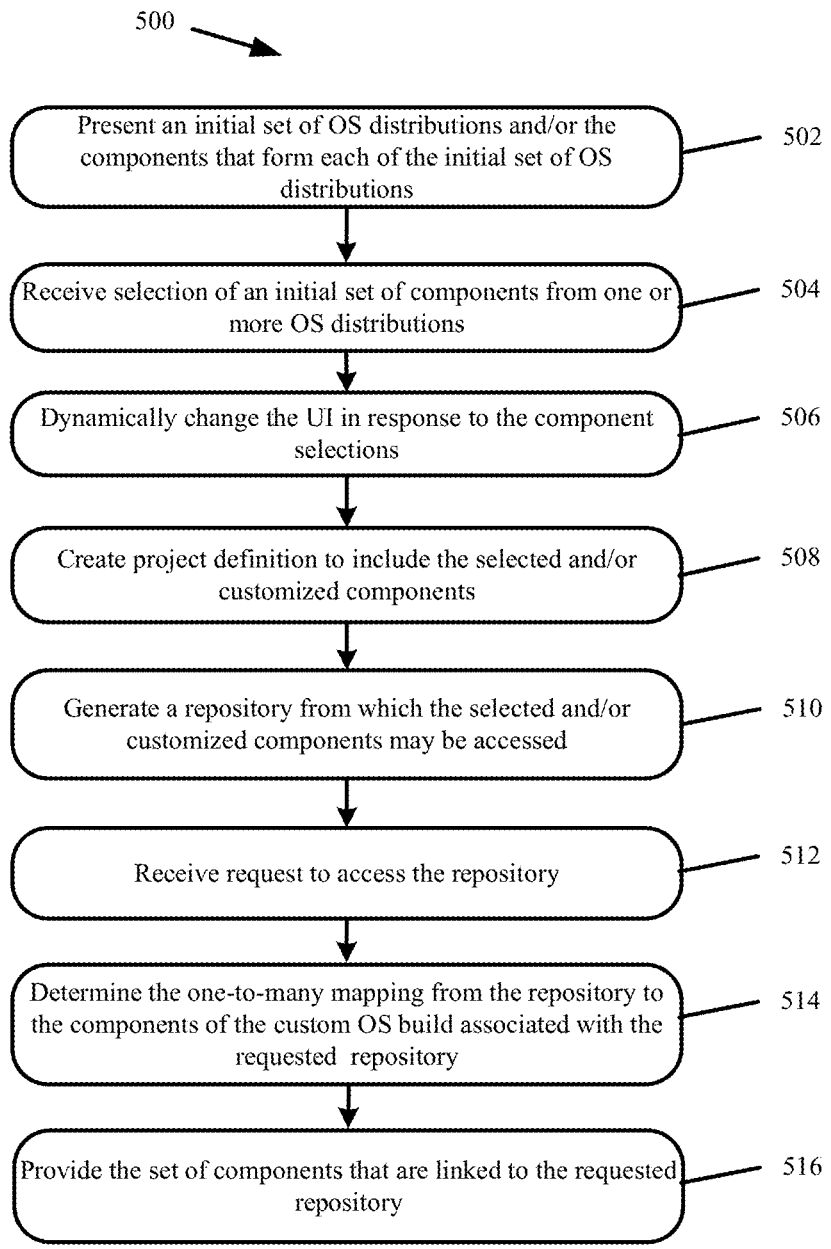
FIG. 5 presents a process for the automated custom OS generation in accordance with some embodiments presented herein.

FIG. 5 presents a process 500 for the automated custom OS generation in accordance with some embodiments presented herein. Process 500 may be implemented via a combination of the dynamic UIs and controller 400, wherein controller 400 may control the dynamic changes made to the UIs in response to user selections.

Process 500 may include presenting (at 502) an initial set of OS distributions and/or the components that form each of the initial set of OS distributions in a UI. For instance, a user device may submit a request to generate a new custom OS build, and controller 400 may provide the UI for graphically selecting an initial kernel and/or base set of components for the custom OS build.

Process 500 may include receiving (at 504) a selection of an initial set of components that are defined as part of an OS distribution for the custom OS build. The selections may be made by a user interacting with the presented (at 502) UI and/or selecting or deselecting components from one or more presented OS distributions.

Process 500 may include dynamically changing (at 506) the UI in response to the component selections. Dynamically changing (at 506) the UI may include presenting components from the component repository that are compatible with and/or share dependencies with a current kernel and/or component selection, that the current user has access to, that are substitutes or alternatives for the current set of selected components, and/or that introduce new services or features not within the original OS distribution. In some embodiments, controller 400 may be configured with compatibility tables and/or dependency tables that identify what components are compatible with or are needed to run with other components. In some other embodiments, the components may include metadata that specifies the dependencies of each component. Dynamically changing (at 506) the UI may also include filtering the presented set of substitute or new components in response to one or more criteria specified for the components by the user. For instance, the user may activate a filter to present only components that run on specific hardware architectures, are optimized for specific hardware architectures, and/or have at least a level 1 FIPS validation.

Process 500 may include creating (at 508) a project definition to include the selected and/or customized components for the custom OS build. In some embodiments, the project definition may include settings, parameter declarations, flags, and/or customizations defined for one or more of the custom OS components.

Process 500 may include generating (at 510) a repository from which the kernel, components, and/or other software associated with the custom OS build may be accessed (e.g., downloaded, deployed, and/or distributed). Generating (at 510) the repository may include defining a unique path, URL, link, and/or other identifier for the custom OS build, and mapping the repository identifier to the actual storage location for each selected component of the custom OS build in the component repository. Generating (at 510) the repository may further include associating the repository with the project definition and/or the database record. In some embodiments, generating (at 510) the repository may include entering a compiled package for the custom OS build into the repository by compiling the software and/or code of the selected and/or customized components for the custom OS build.

Process 500 may include receiving (at 512) a request to access the repository. In some embodiments, the request may include an HyperText Transfer Protocol ("HTTP") GET message that is directed to the repository identifier. In some other embodiments, the request may include a call to access a directory identified by the repository identifier.

Process 500 may include determining (at 514) the one-to-many mapping from the repository to the components of the custom OS build associated with that repository. Controller 400 may query a database based on the repository identifier (e.g., URL, directory path, etc.) provided with the access request. The query may retrieve a record containing the project definition for a particular custom OS build, with the project definition storing the mapping of the repository to the components of the custom OS build associated with the requested repository.

Process 500 may include providing (at 516), in response to the access request, the set of components that are linked to the requested repository. In some embodiments, providing (at 516) the set of components may include populating a website that is accessed using the repository identifier with links to each component of the custom OS build associated with that repository. In some embodiments, providing (at 516) the set of components may include populating a directory that is accessed using the repository identifier with icons or links for each component of the custom OS build associated with that repository. In some embodiments, providing (at 516) the set of components may include distributing the set of components from the component repository to one or more devices identified in the access request. For instance, the access request may specify installing, deploying, and/or downloading the custom OS build to a set of devices that may be located at the same or different sites or that may correspond to different compute nodes allocated from a cloud service provider. In some such embodiments, the access request may include the Internet Protocol ("IP") addressing and/or other access information for accessing the set of devices, and controller 400 may simultaneously or sequentially distribute the custom OS build to each IP address or device listed in the access request. In some embodiments, distributing the custom OS build may include installing the custom OS build package, that is produced from compiling the kernel and/or set of components selected for the custom OS build, on each of the set of devices.

In some embodiments, controller 400 may automatically distribute a particular custom OS build to a set of devices or nodes. In addition to using the UIs to select the components for the particular custom OS, a user may provide IP addressing and/or access information (e.g., security tokens, access credentials, etc.) for the set of devices or nodes that are to run the particular custom OS build. The user may also specify a deployment schedule for the particular custom OS build. Controller 400 may enter the IP addressing, access information, and/or deployment schedule as part of the project definition for the particular custom OS, and may automatically distribute the particular custom OS build to the set of devices or nodes according to the deployment schedule.

In some embodiments, users may access and/or manage their repositories from a UI. Users may modify and/or customize one or more components of a custom OS build, may change access permissions, may define a distribution schedule, and/or implement other changes in response to accessing and/or managing their repositories.

Figure 6:
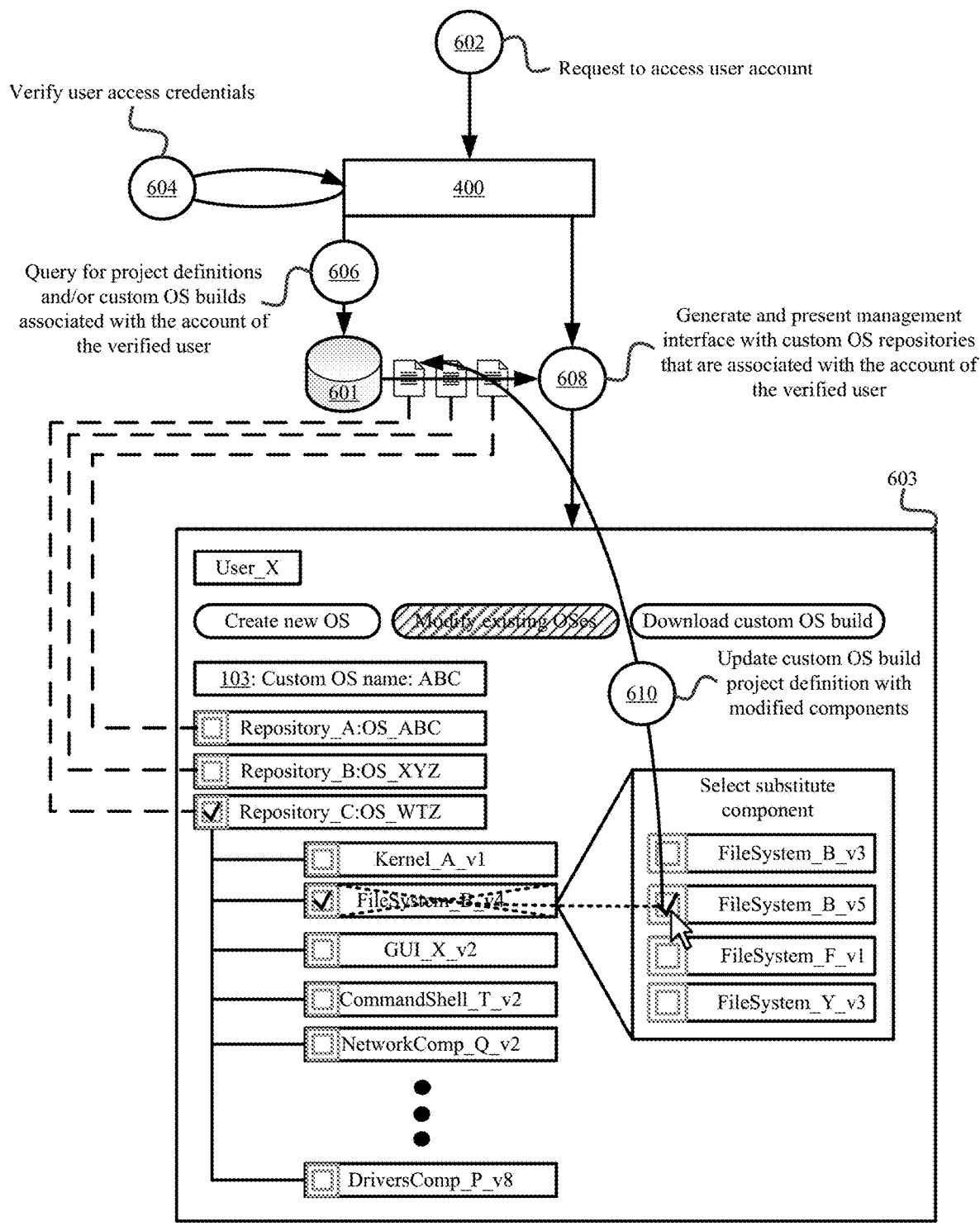
FIG. 6 illustrates an example for accessing and managing custom OS build repositories in accordance with some embodiments presented herein.

FIG. 6 illustrates an example for accessing and managing custom OS build repositories in accordance with some embodiments presented herein. As shown in FIG. 6, a user device may issue (at 602) a request to controller 400 over a network. The request may include access credentials (e.g., username and password) that are associated with a particular user or user account.

Controller 400 may verify (at 604) the access credentials, and may query (at 606) database 601 to retrieve the project definitions and/or custom OS repositories that are associated with the particular user or user account. In some embodiments, the user account may include repositories for custom OS builds that were defined by the particular user and/or other repositories that are created and shared by other users and that the particular user has selected and added to the particular user's account.

Controller 400 may generate (at 608) and present management UI 603 that includes the custom OS repositories that are associated with the particular user or user account. Management UI 603 allows the particular user to swap, replace, add, remove, or modify components of any previously defined custom OS build. For instance, the particular user may wish to add a new component to a particular custom OS build without redefining a different instance of the particular custom OS build that includes the new component. Accordingly, the particular user may select the particular custom OS build from management UI 603, and may select to add the new component.

Controller 400 may update (at 610) the project definition and/or repository for the particular custom OS build based on changes that the particular user makes to the particular custom OS build via the management UI. Controller 400 may download and/or distribute the updated custom OS build to one or more devices that are configured to run that custom OS build. In some embodiments, a user may select a UI element from management UI 603 to initiate the distribution of the updated custom OS build to the one or more devices. Accordingly, the user may change the components of the custom OS build at one time or in one location (e.g., the repository for the particular custom OS build) via management UI 603, and the changes may be propagated to two or more nodes or devices that are configured to run the particular custom OS build.

In some embodiments, controller 400 may leverage the component repository, which serves as a single source of truth for the same component linked to different custom OS builds associated with different repositories, in order to update a particular component at the component repository such that the update automatically propagates to all custom OS builds and/or repositories that include that particular component. In this manner, controller 400 may distribute security updates, feature updates, and/or other updates for the particular component to all repositories and/or custom OS builds that include that particular component without individually updating each repository or each custom OS build and/or without having to keep track of the custom OS builds or repositories that include that particular component.

Figure 7:
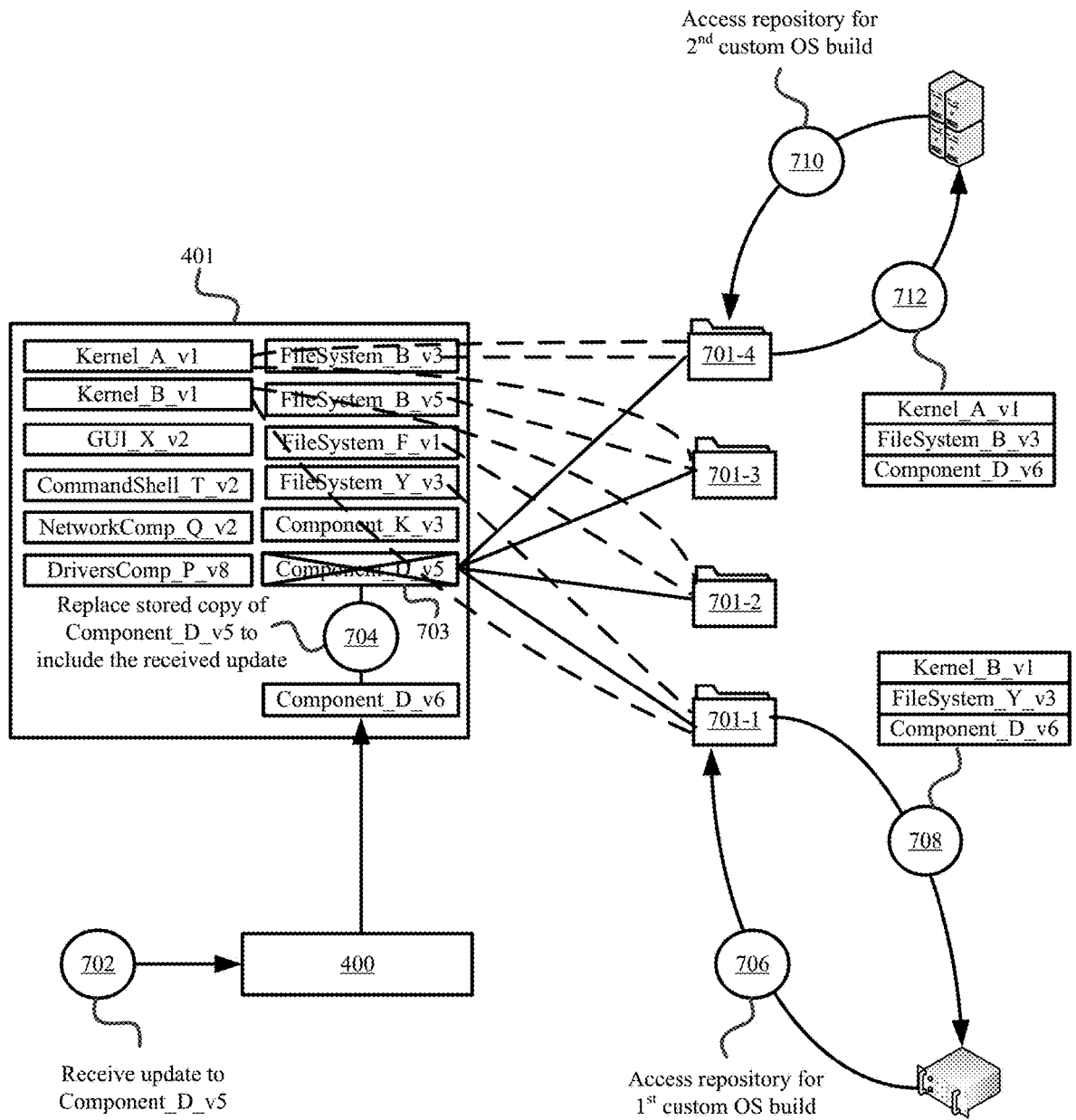
FIG. 7 illustrates an example for automatically updating different custom OS builds in accordance with some embodiments presented herein.

FIG. 7 illustrates an example for automatically updating different custom OS builds in accordance with some embodiments presented herein. FIG. 7 illustrates repositories 701-1, 701-2, 701-3, and 701-4 (herein sometimes collectively referred to as "repositories 701" and individually referred to as "repository 701") that are created for different custom OS builds of different users. Each custom OS build repository 701 is linked to a different set of components in component repository 401, and each set of components includes particular component 703.

Controller 400 may receive (at 702) an update to particular component 703. The update may be provided by the software developer that created particular component 703 or one or more users that contribute to an open source implementation of particular component 703. The update may close or correct a security vulnerability, fix a bug, improve performance, introduce new features or functionality, and/or implement other changes to particular component 703.

Controller 400 may replace (at 704) the existing instance of particular component 703 in component repository 401 with the updated instance of particular component 703. Replacing (at 704) the existing instance may include overwriting the stored copy of particular component 703 in component repository 401, or may include storing a new copy of particular component 703 with a new version number or other identifier.

This single change to component repository 401 may cause the updated instance of the particular component to be propagated to and included as part of each of repositories 701 that include the particular component in their respective custom OS build. Specifically, when overwriting the existing instance of particular component 703 with the updated instance, all links from repositories 701 automatically point to and be associated with the updated instance of particular component 703. When storing the new updated instance of particular component 703 alongside the previous instance, repositories 701 and/or the associated project definitions may be configured to automatically link to the newest instance of particular component 703 in component repository 401, wherein the newest instance may be identified via naming or versioning of particular component 703.

According, after particular component 703 is updated, a first user or device may access (at 706) repository 701-1 for a first custom OS build, and may download (at 708) the first custom OS build from repository 701-1. In some embodiments, repository 701-1 may contain links to a first set of components from component repository 401, wherein the first set of components include particular component 703. Accordingly, downloading (at 708) the first custom OS build from repository 701-1 may include retrieving the stored instance for each component of the first set of components, wherein the stored instance for particular component 703 is now the updated instance, or a compiled build package that includes the updated source code for particular component 703.

Similarly, a second user or device may access (at 710) repository 701-4 for a second custom OS build, and may download (at 712) the second custom OS build. In some embodiments, repository 701-4 may contain links to a second set of components from component repository 401, wherein the second set of components includes one or more components that differ from the first set of components of the first custom OS build but also particular component 703. Downloading (at 712) the second custom OS build from repository 710-4 may therefore include retrieving the stored instance for each component of the second set of components including the updated instance of particular component 703.

Accordingly, controller 400 updating particular component 703 in component repository 401 causes the update to propagate to each repository 701 that links to or includes particular component 703 in the respective custom OS build without having to change any individual repository, any individual project definition, or any individual custom OS build. As soon as the update is entered in component repository 401, all subsequent downloads of custom OS builds that include the updated component will automatically include the updated component.

Some component updates may be more critical or time sensitive than others. Accordingly, controller 400 may provide notifications to users or user devices that have created and/or run custom OS builds affected by such updates. In some such embodiments, controller 400 may perform a reverse one-to-many traversal by identifying the updated component and which repositories or custom OS builds include that updated component. Controller 400 may query the database and/or the project definitions to determine the association between the updated component and the affected repositories, may obtain contact information for each user or user device associated with an affected repository or custom OS build, and may provide a message to each user or user device to download their respective custom OS build to receive the update. The message may be an HTTP message, email, text message, and/or other form of electronic communication.

In some embodiments, controller 400 may be configured to identify any critical updates, and may automatically distribute the updates to the devices that are designated to run the custom OS builds affected by the critical updates. For instance, controller 400 may receive an update to a particular component, may identify the repositories for custom OS builds that link to and/or include the particular component, and may inspect the project definition for each impacted repository to obtain the addressing and/or other access information for the sets of devices running each of the custom OS builds impacted by the updated particular component. Controller 400 may establish a connection to each device of the sets of devices, and may distribute the updated particular component or the entire custom OS build with the updated particular component to the respective devices. In some embodiments, the project definition may specify a time at which the updates may occur. For instance, a first project definition may allow for updates or downloading of a first custom OS build to a first set of devices at midnight every night, and controller 400 may distribute the first custom OS build with the updated particular component to each device of the first set of devices at the scheduled time (e.g., midnight).

Figure 8:
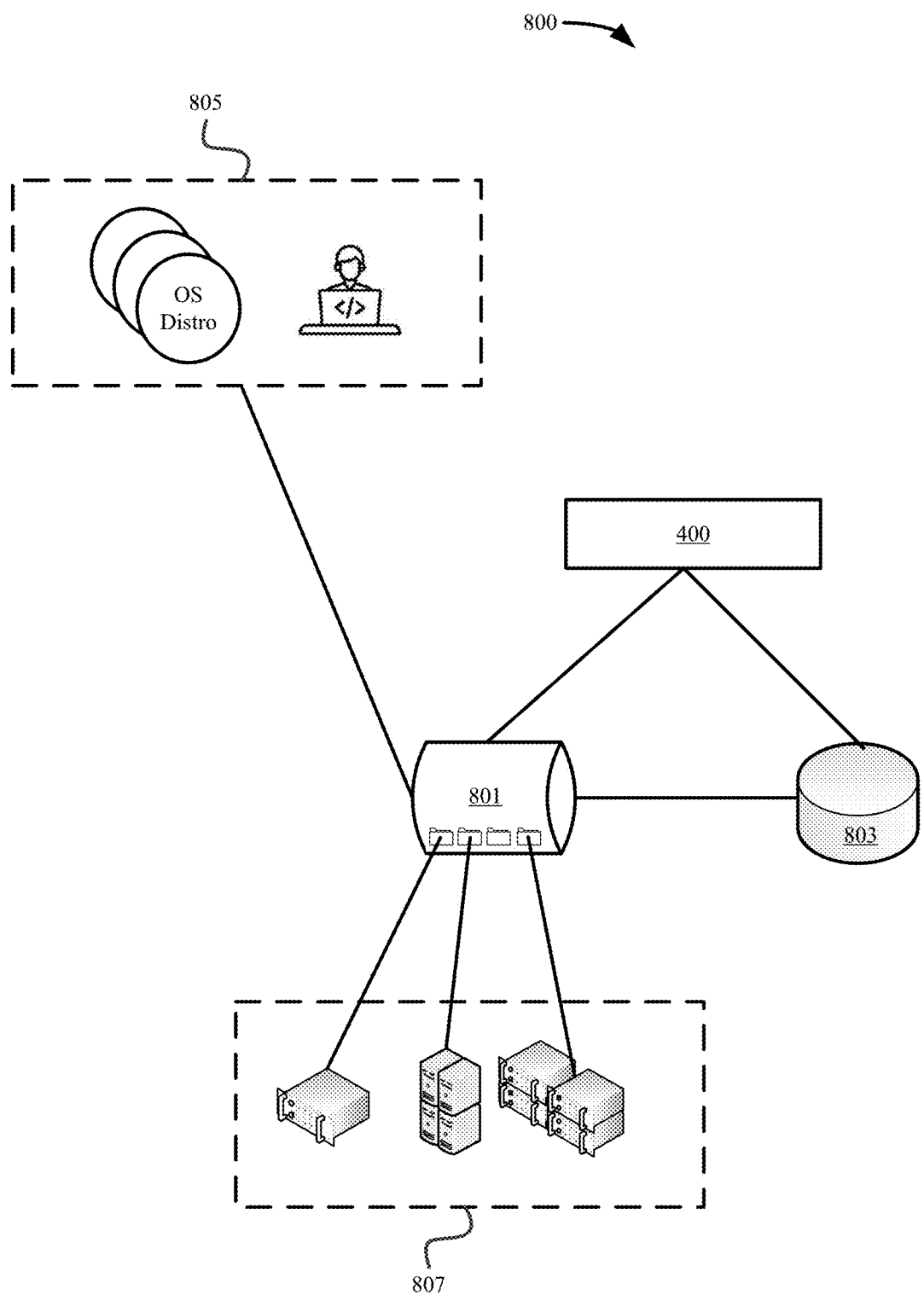
FIG. 8 illustrates an example architecture for the automated building, managing, and distributing of custom OSes in accordance with some embodiments presented herein.

FIG. 8 illustrates an example architecture 800 for the automated building, managing, and distributing of custom OSes in accordance with some embodiments presented herein. Architecture 800 may include component controller 400, component repository 801, project definition database 803, component sources 805, and target devices 807. The illustrated elements may be communicably coupled via one or more data networks. In some embodiments, architecture 800 may include additional or fewer elements.

Controller 400 may include a system or device for generating the custom OS build generation UIs and management UIs, for generating the project definitions based on user interactions with the UIs and/or other user inputs, for generating the repositories with the customized sets of components specified for each custom OS build, and/or for distributing the custom OS builds and/or updates to the custom OS builds to target devices 807. In some embodiments, controller 400 may be a distributed system with a set of distributed devices that provide the automated custom OS build, management, and distribution services for users in different regions.

Component repository 801 may store the components for the different custom OS builds. The components may be sourced or obtained from component sources 805. In some embodiments, component repository 801 may periodically retrieve components from component sources 805. In some embodiments, component sources 805 may add components to component repository 801. The stored components may include Red Hat Package Manager ("RPM") files or software packages, source code, OS kernels, OS plug-ins, utilities, binaries, shells, file systems, device drivers, scripts, desktop environments or GUIs, and/or other software that may be combined to create a custom OS build.

In some embodiments, component repository 801 may include one or more storage devices. The storage devices may be located in a common site, may be distributed across a network, or may be hosted by a network storage provider. In some embodiments, controller 400 may control which component sources 805, target devices 807, and/or users may access component repository 801.

Project definition database 803 may store the project definitions for the different custom OS builds, and/or may track the custom OS builds. Project definition database 803 may store a different record for each defined custom OS build. For instance, the project definition or associated record may track the set of components that form a custom OS build and/or the repository where the set of components may be accessed. More specifically, the project definition and/or associated record may include identifying information that identifies a name, creation date, originating user, and/or other information for a particular custom OS build, a repository identifier (e.g., network address, URL, directory path, link, etc.) for accessing the particular custom OS build, and a mapping of the repository identifier to a set of component identifiers for accessing each component of the set of components included as part of the particular custom OS build.

In some embodiments, the project definition or associated record may track access permissions associated with the custom OS build. For instance, the access permissions may specify which users or devices have permissions to edit or change the custom OS build, and which users or devices have permissions to access the custom OS repository using the repository identifier, or to download the custom OS build from the custom OS repository. In some embodiments, a particular user may define a custom OS build that is accessible to all users. For instance, the particular user may define a custom OS distribution that is provided with an open source license for public user. Alternatively, the particular user may set private access permissions for a custom OS build that limits access to that custom OS build to a specific set of users and/or that limits which set of devices may download and run that custom OS build. Moreover, the project definition may associate different rights to the particular user than other users. For instance, the particular user may be permitted to modify or edit the custom OS build, and other users may be able to access and download the custom OS build without the ability to make any changes to the custom OS build components.

In some embodiments, the access permissions may be granularly defined with addressing and/or other access information for a set of target devices 807 that are designated to run or receive the custom OS build represented by that project definition or record. Controller 400 may restrict access to a custom OS build of a particular project definition to the set of target devices 807 that are identified in the particular project definition. In some embodiments, controller 400 may automatically distribute the custom OS build and/or any updates or changes to the custom OS build to the set of target devices 807 that are identified in the particular project definition. In some embodiments, the particular project definition may specify a distribution schedule with dates and times at which controller 400 may automatically distribute the custom OS build to the set of target devices 807 identified in the particular project definition.

Component sources 805 may include repositories for different OS distributions that are made available without customization by different developers. For instance, component repository may retrieve one or more CENTOS distributions from a first component source 805 and one or more Rocky Linux distributions from a second component source 805. Component sources 805 may also include developers that contribute different components to component repository 801. For instance, a developer may modify a particular component by adding new features, fixing bugs, providing a FIPS validation, and/or performing other changes to the particular component. The developer may add the updated instance of the particular component to component repository 801. The UIs provided by controller 400 may expose the original instance of the particular component and the updated instance of the particular component for inclusion as part of a custom OS. In this manner, component repository 801 may include not only the components that are included with standard OS distributions, but also modified versions of those components or new components that users may use to customize those distributions and create their own custom OS builds. In this manner, a user may develop software that they want included in various custom OS builds, may upload the software to component repository 801 with access permissions that may restrict which users have access to the software, and may include that software with each and every custom OS build defined by that user. For instance, the user may develop OS software with a specific set of features for the user's operating environment and/or with company specific branding. The user may upload that OS software to component repository 801, may create custom OS distributions that include the custom OS software, and may make the custom OS distributions accessible to others for use.

Target devices 807 may include user devices or allocated resources from compute nodes of a cloud service provider that are designated to download and/or run different custom OS builds. In some embodiments, target devices 807 may issue requests to controller 400. Each request may include an identifier for a particular repository. Controller 400 may determine the custom OS build that is accessed from the particular repository, and may provide links to and/or may distribute the specific set of components that are associated with that custom OS build from component repository 801 to the requesting target device 807.

Figure 9:
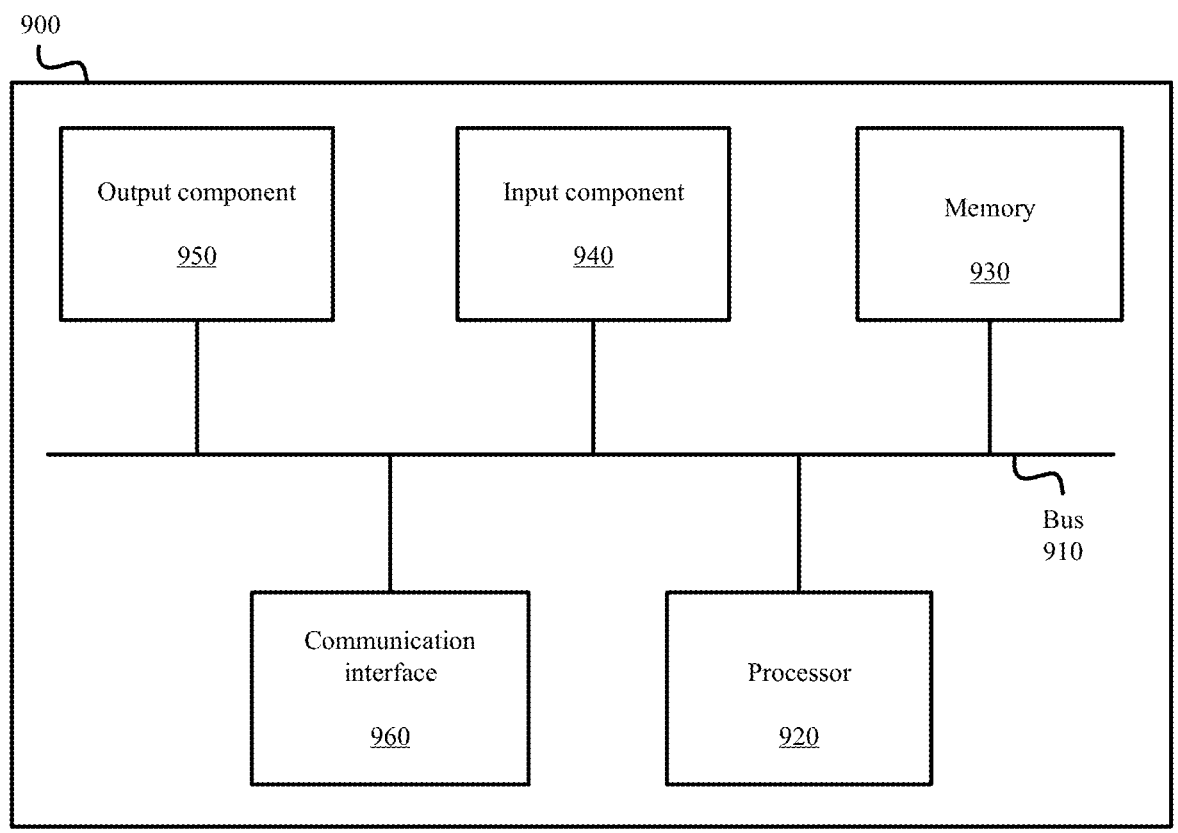
FIG. 9 illustrates example components of one or more devices, according to one or more embodiments described herein.

FIG. 9 is a diagram of example components of device 900. Device 900 may be used to implement one or more of the devices or systems described above (e.g., controller 400, component repository 801, component sources 805, target devices 807, compute nodes, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
providing a user interface ("UI") comprising a plurality of selectable elements for different operating system ("OS") distributions;
detecting user input based on user interactions with the UI;
presenting, in response to the user input comprising a selection of a particular selectable element for a particular OS distribution, a first set of components that are included with the particular OS distribution, and
a second set of components that are not included with the particular OS distribution and that provide different services or functionality than the first set of components;
customizing the particular OS distribution by removing one or more of the first set of components that provide a first set of services for a custom OS build, and by adding one or more of the second set of components that provide a second set of services to the custom OS build in response to the user input;
automatically generating the custom OS build based on a first subset of components that are selected from the first set of components presented in the UI, and
a second subset of components that are selected from the second set of components presented in the UI, wherein the custom OS build differs from the particular OS distribution based on said customizing;
providing a repository for the custom OS build that is accessed with a particular identifier and that links to each component of the first subset of components and the second subset of components; and
distributing the custom OS build including the first subset of components and the second subset of components from the repository to one or more nodes.

2. The method of claim 1 further comprising:
detecting selection of a particular component from the first set of components;
querying a component repository for one or more components that are substitutes for the particular component and that provide at least one different service, feature, or validation than the particular component in response to detecting the selection;
modifying the UI to present selectable elements for each component of the one or more components in the UI; and
wherein generating the custom OS build comprises replacing the particular component of the particular OS distribution with a substitute component from the one or more components in response to a selection of a selectable element for the substitute component.

3. The method of claim 1 further comprising:
querying a component repository for OS components that are compatible with the first set of components that are included with the particular OS distribution, wherein the component repository stores a plurality of components for the different OS distributions and for customizing the different OS distributions; and
selecting the second set of components from the plurality of components as components that are compatible with the first set of components.

4. The method of claim 1, wherein generating the custom OS build comprises:
modifying one or more of a kernel, file services, and network services of the particular OS distribution.

5. The method of claim 1 further comprising:
storing the first set of components and the second set of components in a component repository; and
mapping the particular identifier of the repository for the custom OS build to each component of the first subset of components and the second subset of components in the component repository.

6. The method of claim 1, wherein the custom OS build is a first custom OS build, the method further comprising:
defining a second custom OS build based on a third subset of the first set of components and a fourth subset of the second set of components, wherein the third subset of components and the fourth subset of components from the second custom OS build comprises one or more shared components with the first subset of components and the second subset of components from the first custom OS build; and
providing a second repository for the second custom OS build that is accessed with a second identifier, wherein the second identifier is different than the particular identifier of the first custom OS build, and wherein the second identifier links to each of the one or more shared components and one or more other components that are included in the third subset of components and the fourth subset of components and that are not included in the first subset of components and the second subset of components.

7. The method of claim 1 further comprising:
receiving one or more criteria for customized components of the custom OS build; and
filtering a plurality of components to select the second set of components that satisfy the one or more criteria.

8. The method of claim 7, wherein filtering the plurality of components comprises:
selecting components from the plurality of components with a Federal Information Processing Standard ("FIPS") validation.

9. The method of claim 1 further comprising:
receiving a request directed to the particular identifier from the one or more nodes; and
wherein distributing the custom OS build comprises providing links with which the one or more nodes download the first subset of components and the second subset of components.

10. The method of claim 1 further comprising:
storing a plurality of components in a component repository;
providing a different repository with a different access identifier for each custom OS build of a plurality of custom OS builds, wherein each repository for each custom OS build of the plurality of custom OS builds links a particular component of the plurality of components that is included as part of each custom OS build of the plurality of custom OS builds;
updating a stored copy of the particular component in the component repository; and
distributing an update to each custom OS build of the plurality of custom OS builds as a result of updating the stored copy of the particular component in the component repository and each repository for each custom OS build of the plurality of custom OS builds linking to the stored copy of the particular component.

11. The method of claim 1 further comprising:
defining access permissions for the custom OS build;
receiving access requests directed to the particular identifier from a first set of devices and a second set of devices; and
wherein said distributing comprises:
downloading the first subset of components and the second subset of components to the first set of devices in response to the first set of devices being associated with the access permissions; and
preventing the second set of devices from accessing the first subset of components and the second subset of components in response to the second set of devices not being associated with the access permissions.

12. A system comprising:
one or more processors configured to:
provide a user interface ("UI") comprising a plurality of selectable elements for different operating system ("OS") distributions;
detect user input based on user interactions with the UI;
present, in response to the user input comprising a selection of a particular selectable element for a particular OS distribution, a first set of components that are included with the particular OS distribution, and a second set of components that are not included with the particular OS distribution and that provide different services or functionality than the first set of components;
customize the particular OS distribution by removing one or more of the first set of components that provide a first set of services for a custom OS build, and by adding one or more of the second set of components that provide a second set of services to the custom OS build in response to the user input;
automatically generate the custom OS build based on a first subset of components that are selected from the first set of components presented in the UI, and
a second subset of components that are selected from the second set of components presented in the UI, wherein the custom OS build differs from the particular OS distribution based on said customizing;
provide a repository for the custom OS build that is accessed with a particular identifier and that links to each component of the first subset of components and the second subset of components; and
distribute the custom OS build including the first subset of components and the second subset of components from the repository to one or more nodes.

13. The system of claim 12 further comprising:
a component repository storing a plurality of components associated with the different OS distributions and customizing the different OS distributions.

14. The system of claim 13, wherein the one or more processors are further configured to:
detect selection of a particular component from the first set of components;
query the component repository for one or more components that are substitutes for the particular component and that provide at least one different service, feature, or validation than the particular component in response to detecting the selection;
modify the UI to present selectable elements for each component of the one or more components in the UI; and
wherein generating the custom OS build comprises replacing the particular component of the particular OS distribution with a substitute component from the one or more components in response to a selection of a selectable element for the substitute component.

15. The system of claim 13, wherein the one or more processors are further configured to:
query the component repository for OS components that are compatible with the first set of components that are included with the particular OS distribution; and
select the second set of components from the plurality of components as components that are compatible with the first set of components.

16. The system of claim 13, wherein the one or more processors are further configured to:
map the particular identifier of the repository for the custom OS build to each component of the first subset of components and the second subset of components in the component repository.

17. The system of claim 12, wherein generating the custom OS build comprises:
modifying one or more of a kernel, file services, and network services of the particular OS distribution.

18. A non-transitory computer-readable medium, storing a plurality of processor-executable instructions to:

provide a user interface ("UI") comprising a plurality of selectable elements for different operating system ("OS") distributions;
detect user input based on user interactions with the UI;
present, in response to the user input comprising a selection of a particular selectable element for a particular OS distribution, a first set of components that are included with the particular OS distribution, and
a second set of components that are not included with the particular OS distribution and that provide different services or functionality than the first set of components;
customize the particular OS distribution by removing one or more of the first set of components that provide a first set of services for a custom OS build, and by adding one or more of the second set of components that provide a second set of services to the custom OS build in response to the user input;
automatically generate the custom OS build based on a first subset of components that are selected from the first set of components presented in the UI, and
a second subset of components that are selected from the second set of components presented in the UI, wherein the custom OS build differs from the particular OS distribution based on said customizing;
provide a repository for the custom OS build that is accessed with a particular identifier and that links to each component of the first subset of components and the second subset of components; and
distribute the custom OS build including the first subset of components and the second subset of components from the repository to one or more nodes.

\* \* \* \* \*